(12) United States Patent
Oxley et al.

(10) Patent No.: US 9,394,020 B2
(45) Date of Patent: Jul. 19, 2016

(54) AUTOMOTIVE BODY COMPONENTS AND ASSEMBLIES

(71) Applicant: Shape Corp., Grand Haven, MI (US)

(72) Inventors: Brian Paul Oxley, Ada, MI (US); Joseph Robert Matecki, Allendale, MI (US)

(73) Assignee: SHAPE CORP., Grand Haven, MI (US)

( * ) Notice: Subject to any disclaimer, the term of this patent is extended or adjusted under 35 U.S.C. 154(b) by 0 days.

(21) Appl. No.: 14/558,241

(22) Filed: Dec. 2, 2014

(65) Prior Publication Data

US 2015/0203158 A1 Jul. 23, 2015

Related U.S. Application Data

(60) Provisional application No. 61/930,709, filed on Jan. 23, 2014.

(51) Int. Cl.
| | | |
|---|---|---|
| *B62D 65/02* | (2006.01) | |
| *B65D 27/02* | (2006.01) | |
| *B62D 27/02* | (2006.01) | |
| *B62D 25/04* | (2006.01) | |

(52) U.S. Cl.
CPC ............. *B62D 65/02* (2013.01); *B62D 25/04* (2013.01); *B62D 27/02* (2013.01); *Y10T 29/49622* (2015.01)

(58) Field of Classification Search
CPC ........ B62D 21/02; B62D 21/03; B62D 25/04; B62D 25/06; B62D 25/08; B62D 25/082; B62D 25/085; B62D 25/16; B62D 27/02; B62D 27/023; B62D 27/026; B62D 65/02
USPC ............ 296/30, 203.01, 203.02, 203.03, 205
See application file for complete search history.

(56) References Cited

U.S. PATENT DOCUMENTS

| | | |
|---|---|---|
| 5,632,508 A | 5/1997 | Jacobs et al. |
| 6,003,935 A | 12/1999 | Kalazny |

(Continued)

OTHER PUBLICATIONS

International Search Report and Written Opinion from PCT/US2014/068161 dated Mar. 23, 2015.

*Primary Examiner* — Jason S Daniels

(74) *Attorney, Agent, or Firm* — Gardner, Linn, Burkhart & Flory, LLP

(57) ABSTRACT

The specification discloses automotive body components including roll-formed components and slip-plane brackets. The roll-formed components may be used in place of components manufactured using other techniques, such as hydroforming. The slip-plane brackets may be adjustably positioned on the roll-formed components. More specifically, the slip-plane brackets are adjustable in two or more dimensions (e.g. laterally and longitudinally) before attachment, so that the brackets may compensate for tolerances in the roll-formed components. Attachment techniques may include welding and/or adhering.

27 Claims, 16 Drawing Sheets

(56) References Cited

U.S. PATENT DOCUMENTS

| | | |
|---|---|---|
| 6,412,818 B1 | 7/2002 | Marando |
| 7,665,800 B2 * | 2/2010 | Werner ............... B62D 33/02 296/183.1 |
| 8,333,095 B2 | 12/2012 | Heinz et al. |
| 8,333,096 B2 | 12/2012 | Heinz et al. |
| 8,763,437 B2 | 7/2014 | Heinz et al. |
| 2006/0255624 A1 * | 11/2006 | Zimmerman ........ B62D 25/04 296/193.06 |
| 2007/0108803 A1 | 5/2007 | Chen et al. |
| 2007/0257517 A1 | 11/2007 | Day et al. |
| 2008/0052908 A1 | 3/2008 | Reed et al. |
| 2012/0161476 A1 * | 6/2012 | Baccouche ........... B62D 21/15 296/203.01 |
| 2014/0232138 A1 * | 8/2014 | Kanaguichi ........... B62D 25/04 296/187.12 |

\* cited by examiner

AUTOMOTIVE BODY COMPONENTS AND ASSEMBLIES

BACKGROUND OF THE INVENTION

The present invention relates to automotive components and assemblies, and more particularly to automotive body components and assemblies.

Automotive body components and assemblies are well developed and well known to those skilled in the art. For example, pillars and rails are often hydroformed. Brackets are attached to the pillars often by welding, and body panels are attached to the brackets again often by welding. Example A-pillars and B-pillars within an automotive vehicle are illustrated in FIGS. 1 and 2.

Roll-formed bumper components having curves or "sweeps" also are well known to those skilled in the art. Such roll-formed components are often described as one-dimensional, two-dimensional, or three-dimensional. A one-dimensional component includes a single curve in a single plane. A two-dimensional component includes both negative and positive curves in a single plane. A three-dimensional component includes curves in two or more orthogonal planes.

SUMMARY OF THE INVENTION

In a first aspect of the invention, automotive body components, such as pillars and rails, are fabricated as roll-formed components.

In a second aspect, the automotive body roll-formed components are of the three-dimensional type, including curves in at least two orthogonal planes.

In a third aspect, an automotive body assembly includes a roll-formed body component, a slip-plane hand-off bracket attached to the roll-formed component, and a body panel attached to the bracket. The slip-plane bracket is adjustable during manufacture in two orthogonal directions with respect to the roll-formed component, enabling the mounting plane to be adjustably positioned with respect to the roll-formed component. The slip-plane bracket enables the body panel, when attached to the bracket, to be positioned in a desired location with respect to the other automotive body components and parts.

The roll-formed automotive body components provide enhanced strength at a reduced cost in comparison with current components. The slip-plane brackets provide relatively precise location of the supported body panels with respect to the remainder of the vehicle.

These and other advantages and features of the invention will be more fully understood and appreciated by reference to the description of the current embodiments and the drawings.

DESCRIPTION OF THE CURRENT EMBODIMENTS

Figure 1:
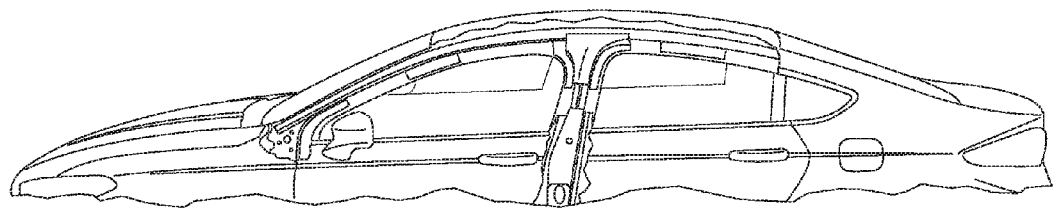
FIG. 1 is a perspective view of a vehicle including prior art automotive body components.
Figure 2:
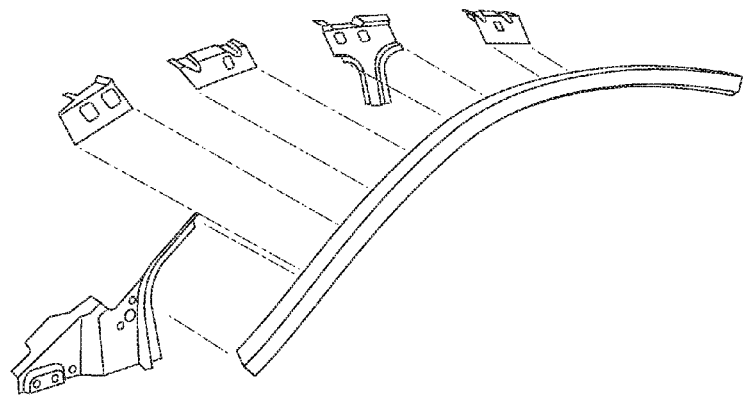
FIG. 2 is an exploded perspective view of the prior art automotive body components.
Figure 3:
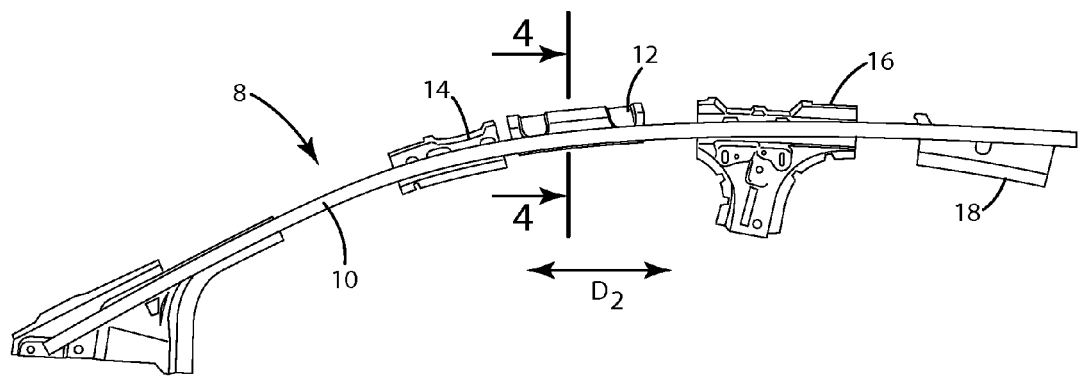
FIG. 3 is a side view of a first embodiment of an automotive body assembly including components in accordance with the present invention.
Figure 4:
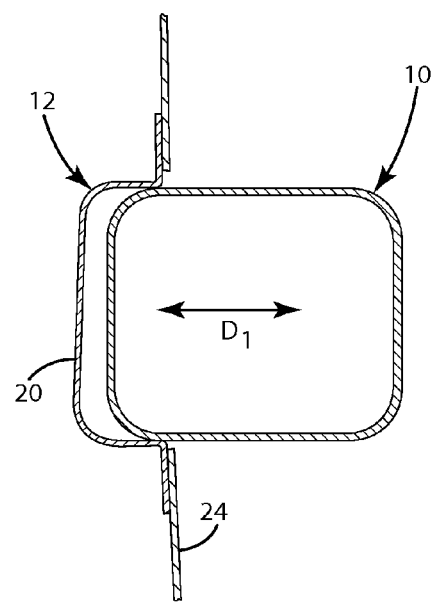
FIG. 4 is a sectional view taken along the line 4-4 in FIG. 3.

A roof rail assembly constructed in accordance with a first embodiment of the present invention is illustrated in FIGS. 3 and 4 and generally designated 8. The assembly 8 includes a component 10, namely a roof rail. The rail 10 may be manufactured using equipment and methods known to those skilled in the art. The roof rail 10 is of the three-dimensional type in which the rail is curved in at least two orthogonal directions.

The assembly 8 includes a plurality of brackets 12, 14, 16, and 18 secured to the roof rail 10. The brackets provide attachment structure for body components. The particular configuration of each bracket will depend on the body component to be supported. The bracket 12, and indeed each bracket, preferably includes a U-shaped portion 20 shaped and dimensioned to fit about the roof rail 10. The U-shaped portion 20 enables the bracket 12 to be adjustably positioned laterally with respect to the roof rail 10 back and forth in the direction D1 (FIG. 4) and to be adjustably positioned longitudinally with respect to the roof rail in the direction D2. Therefore, the bracket 12 may be positioned in essentially an infinite number of positions in both the D1 and D2 directions to position the bracket in a desired location. After the bracket is so positioned, the bracket is attached to the roof rail 10 using any suitable means now known or later developed. Such means may include welding and/or adhering. The adjustability of the brackets provides compensation for shape and/or dimensional tolerances in the roof rail 10.

Figure 5:
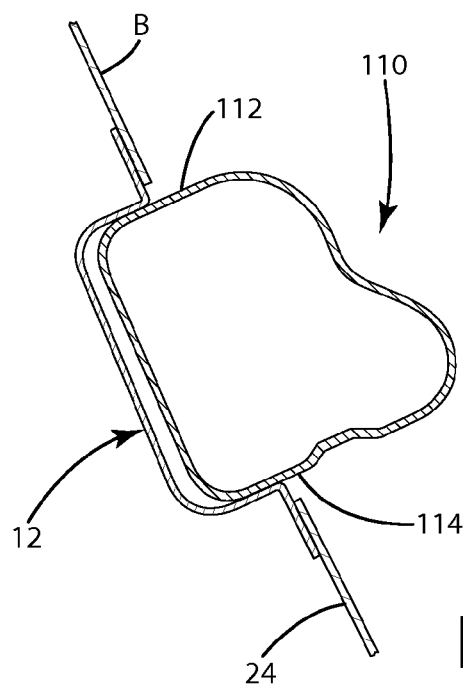
FIG. 5 is a sectional view of a second embodiment of an automotive body assembly.

A modified roof rail 110 is illustrated in FIG. 5. The primary difference between the roof rail 110 and the roof rail 10 is its cross-sectional shape. The shape may be selected to balance desired strength within a desired physical envelope. As with the roof rail 10, the roof rail 110 includes a pair of opposed walls 112 and 114 that may be substantially parallel to one another and generally perpendicular to the body panel B supported by the bracket 12.

Figure 6:
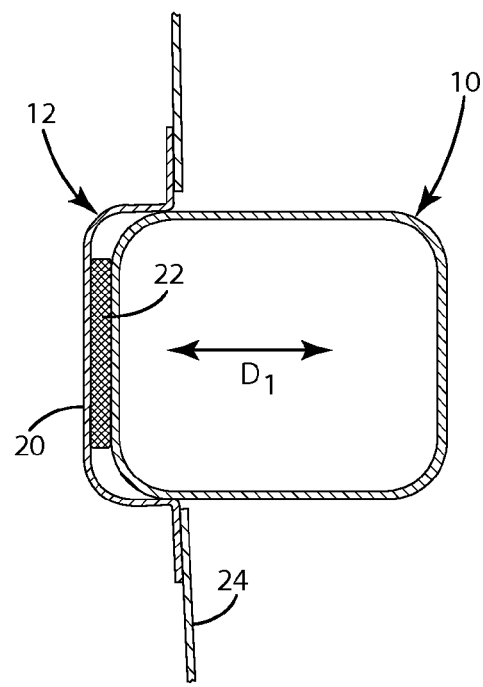
FIG. 6 is a sectional view of a third embodiment of an automotive body assembly.

FIG. 6 illustrates the inclusion of a structural adhesive 22 between the roof rail 10 and the bracket 12. As illustrated, the adhesive 22 extends between the rail and the bracket to inter-secure the two. The adhesive may be in place of or in addition to weld locations between the bracket and the rail.

Figures 7A, 7B, 7C:
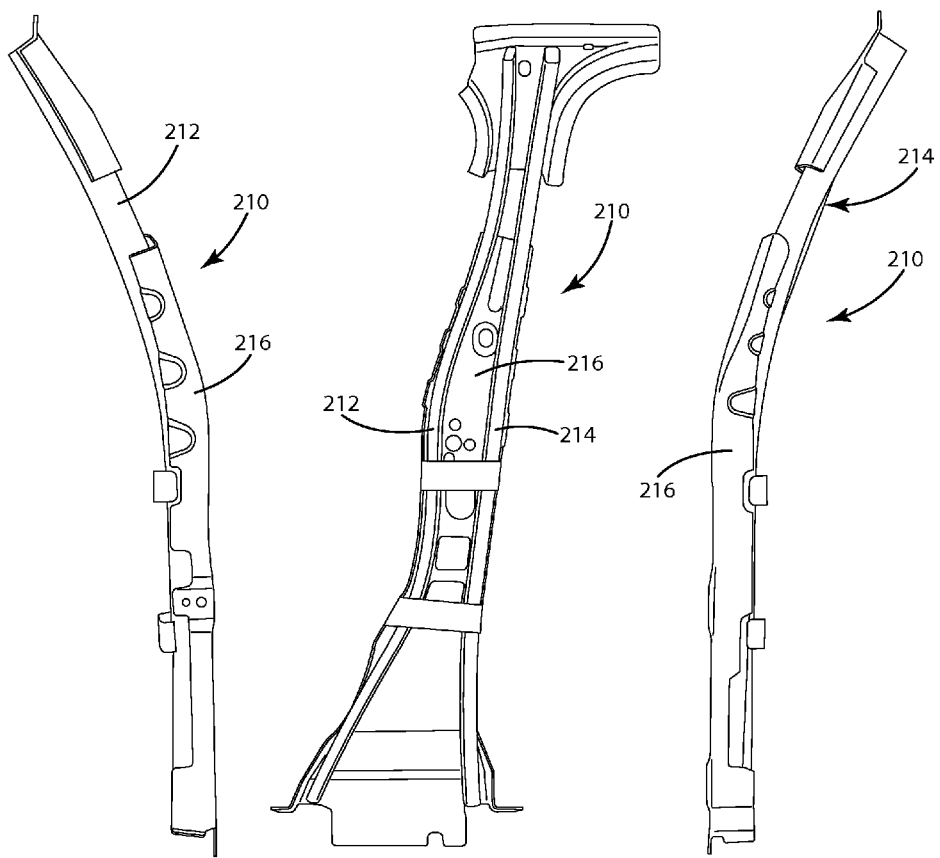
FIGS. 7A, 7B, and 7C are front, side, and rear views respectively of a B-pillar in accordance with the present invention.

A B-pillar 210 constructed in accordance with the present invention is illustrated in FIGS. 7A, 7B, and 7C. The B-pillar 210 includes a pair of roll-formed components 212 and 214 interconnected by a stamped web 216. Each of the roll-formed components 212 and 214 is of the three-dimensional type. The components 212 and 214 can be attached to the web 216 by any techniques now known or later developed, including welding and/or adhesive.

Figures 8A, 8B, 8C:
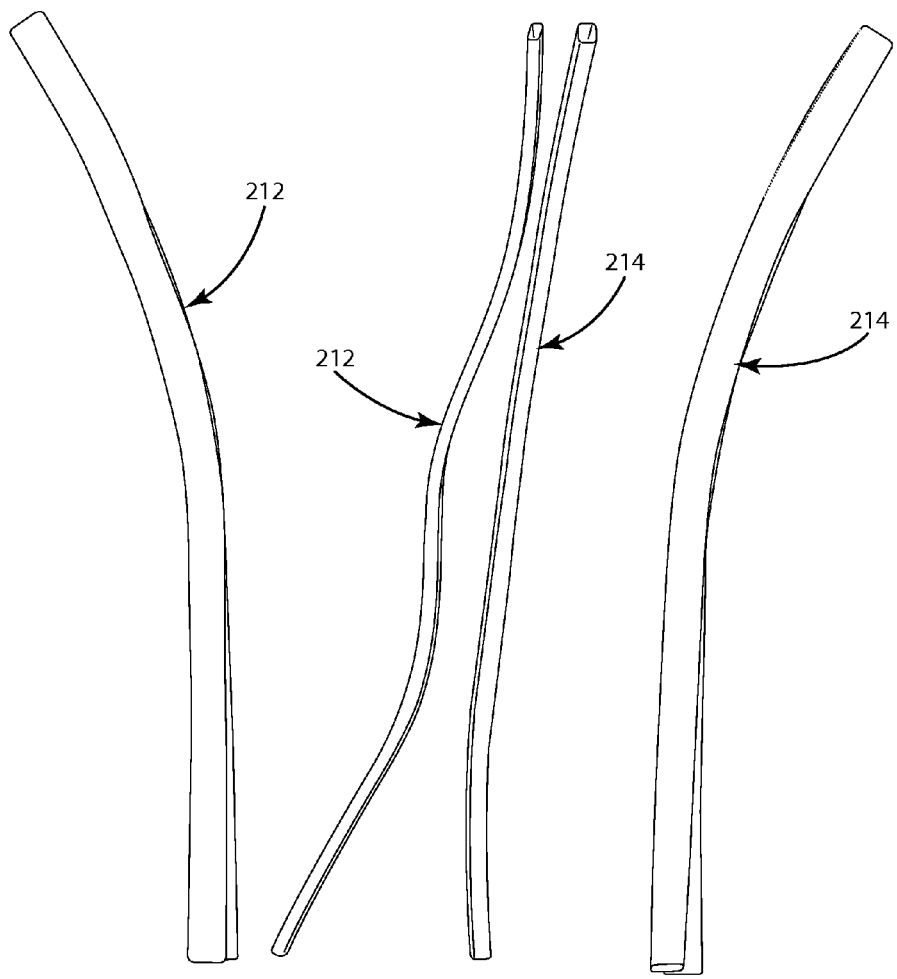
FIGS. 8A, 8B, and 8C are front, side, and rear views respectively of the roll-formed components in the B-pillar.

For additional clarity, the roll-formed components 212 and 214 of the B-pillar 10 are illustrated by themselves in FIGS. 8A, 8B, and 8C.

As illustrated in FIGS. 9-23, roll-formed components in accordance with the present inventions may be used in a wide variety of locations within an automotive vehicle body.

Figure 9:
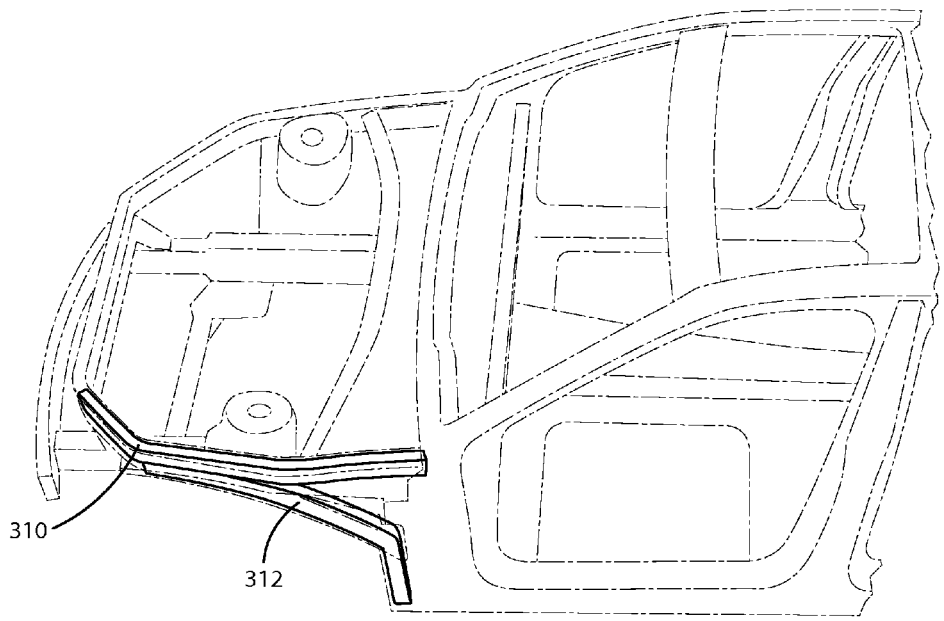
FIGS. 9-23 are perspective views of automotive bodies schematically showing the inclusion of roll-formed components.

FIG. 9 illustrates an automotive body including a roll-formed shotgun component 310 and a roll-formed fender liner component 312. The shotgun component and fender liner component, as well as other components illustrated in other drawings, may be designed to absorb crash impact energy as well as arranged to "push" crash impacts to the side of the vehicle body, especially during "small overlap" crashes, for example, according to the Insurance Institute for Highway Safety (IIHS) small overlap test protocol.

Figure 10:
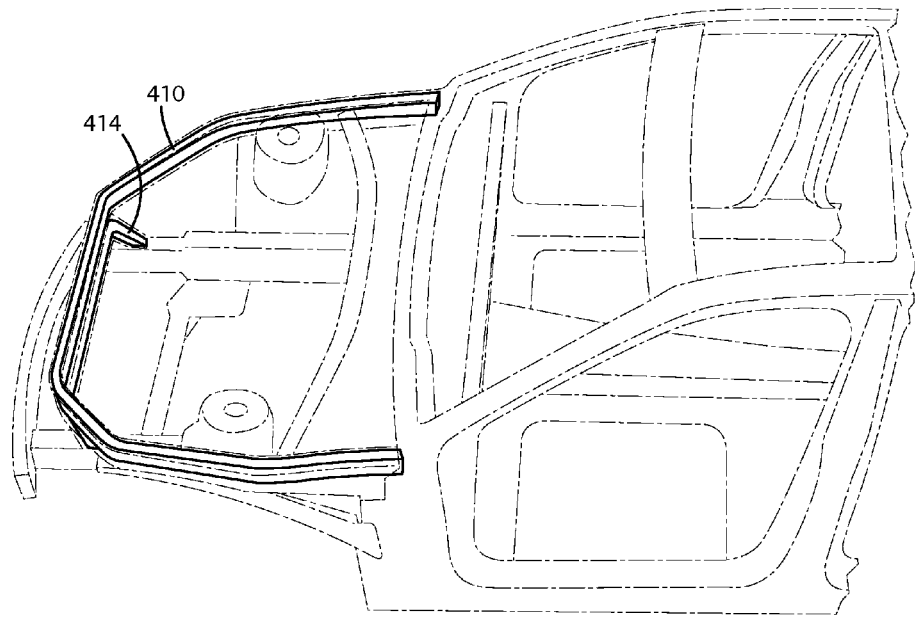

FIG. 10 illustrates an automotive body including a roll-formed shotgun component 410 and a roll-formed lower component 414.

Figure 11:
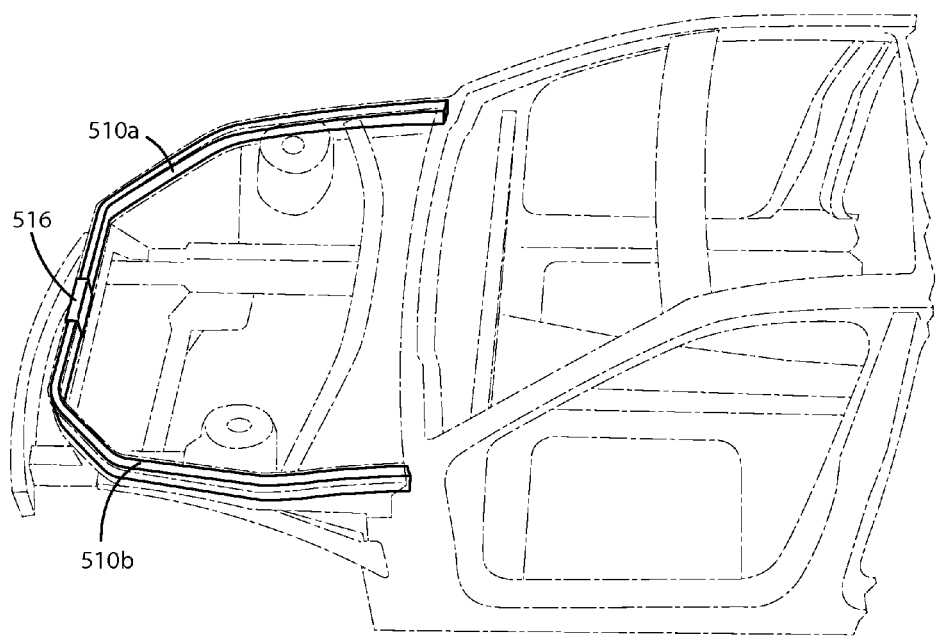
Figure 12:
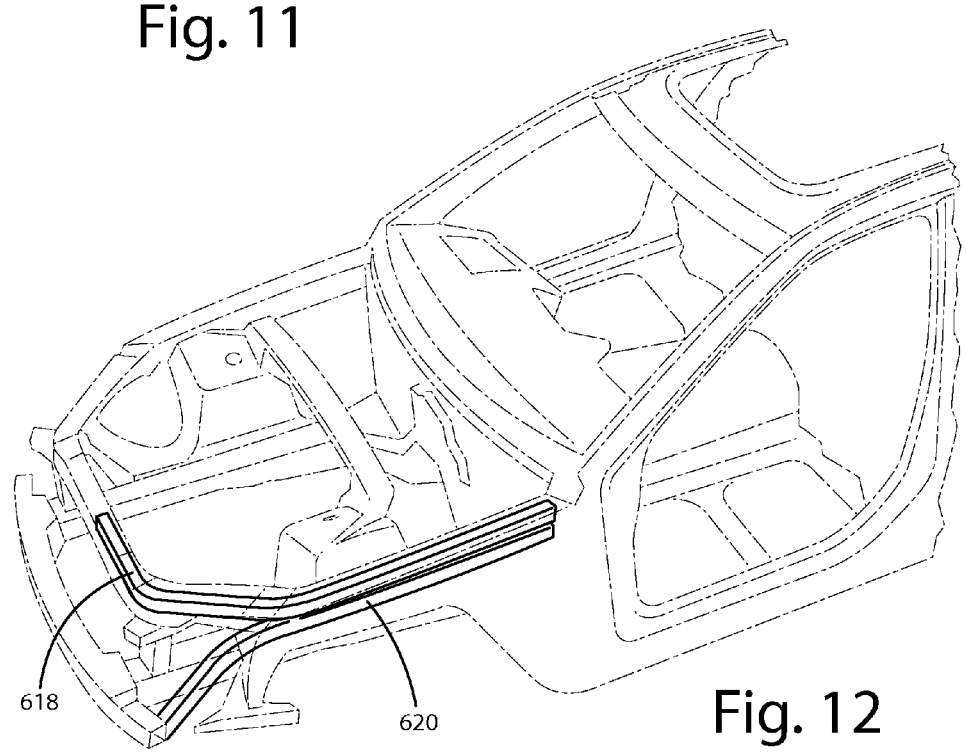
Figure 13:
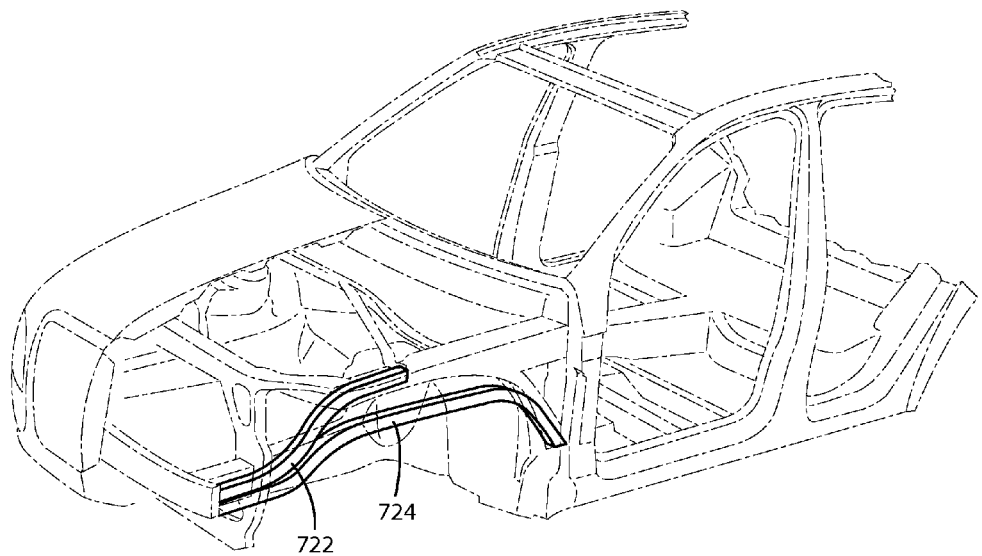
Figure 14:
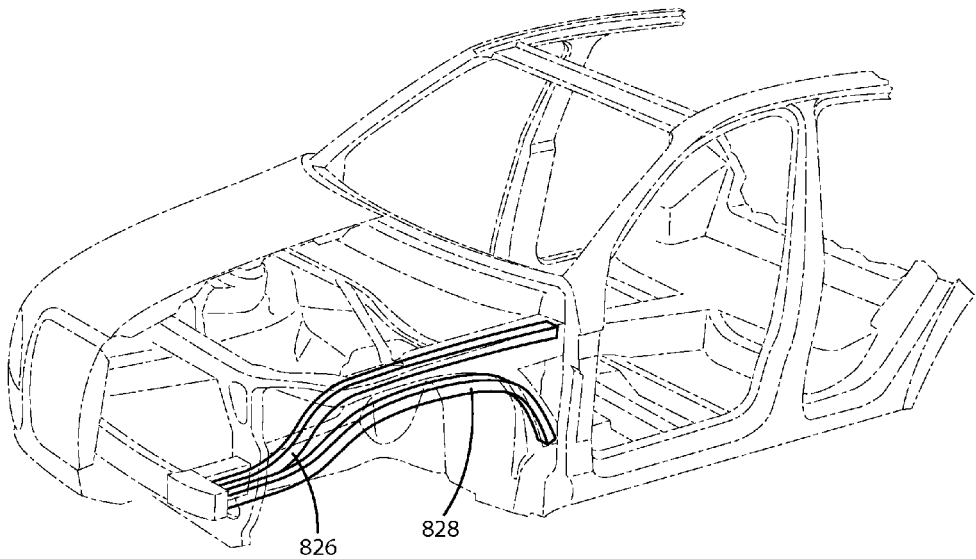
Figure 15:
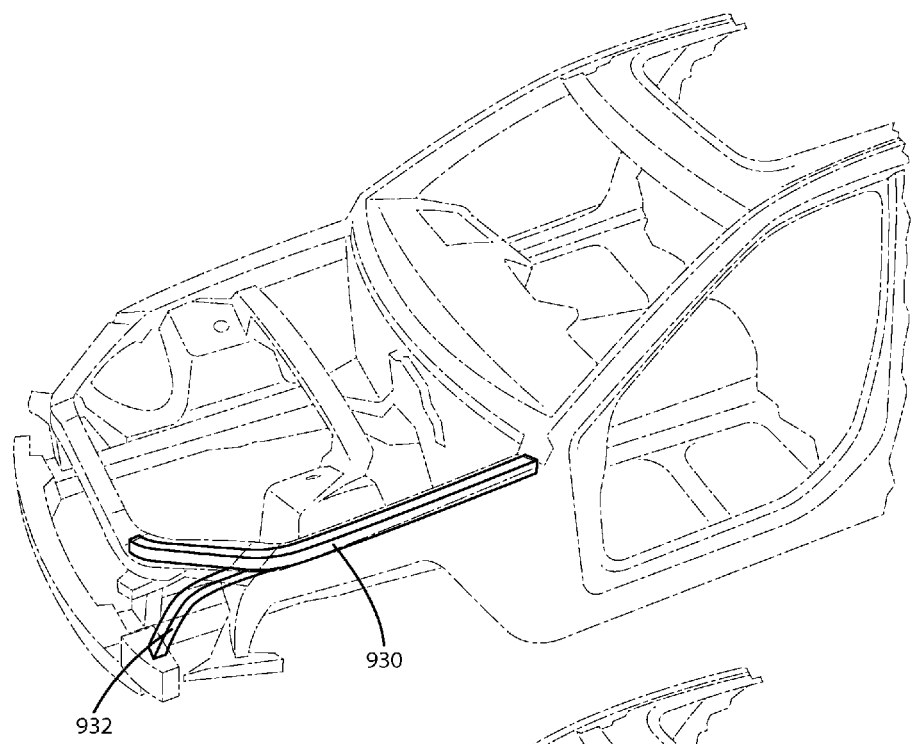

FIG. 11 illustrates an automotive body including two roll-formed components shotgun half components 510a and 510b interconnected by a connector 516.

FIGS. 12-15 and 18 illustrate automotive bodies including roll-formed components 618 and 620 (FIG. 12), 722 and 724 (FIG. 13), 826 and 828 (FIG. 14), 930 and 932 (FIG. 15), and 1032 and 1034 (FIG. 18) adjacent the engine compartment and attached to the hinge pillar. The components provide a load path to assist in transferring impact forces to the hinge pillar and the A-pillar.

Figure 16:
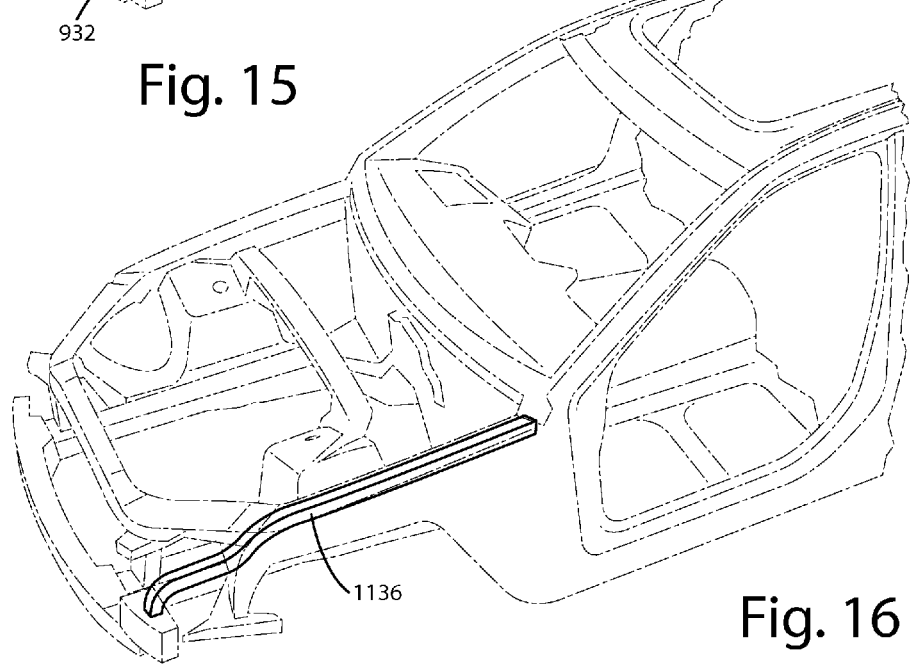
Figure 20:
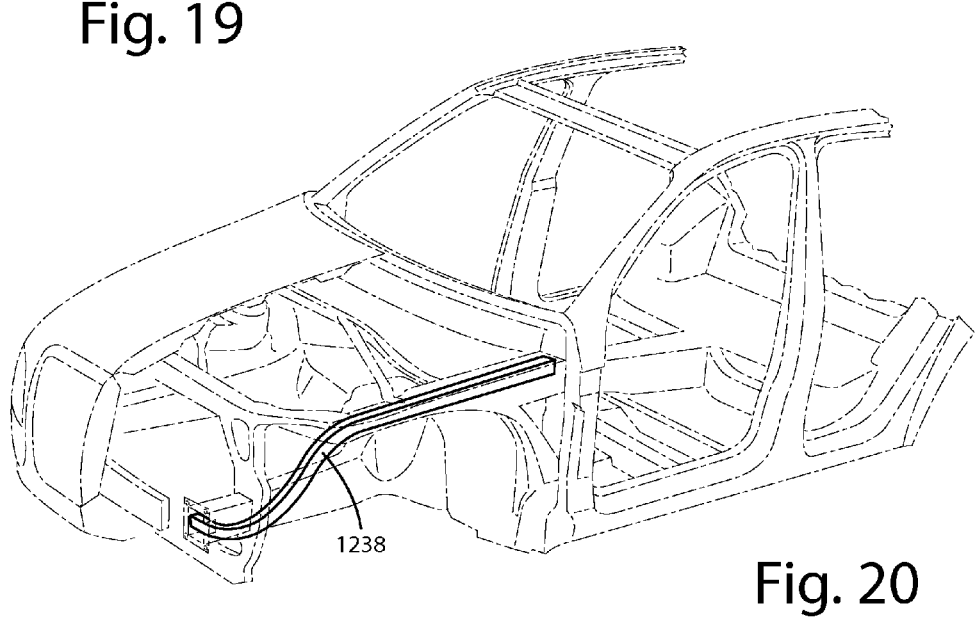

FIGS. 16 and 20 illustrate automotive bodies including roll-formed shotgun components 1136 (FIG. 16) and 1238 (FIG. 20) extending between the bumper and the hinge pillar.

Figure 17:
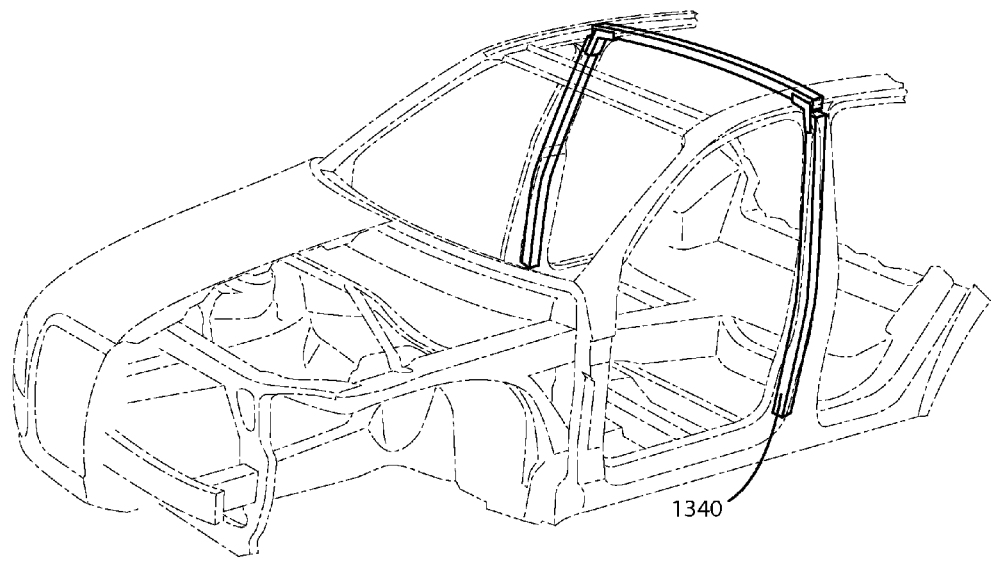
Figure 18:
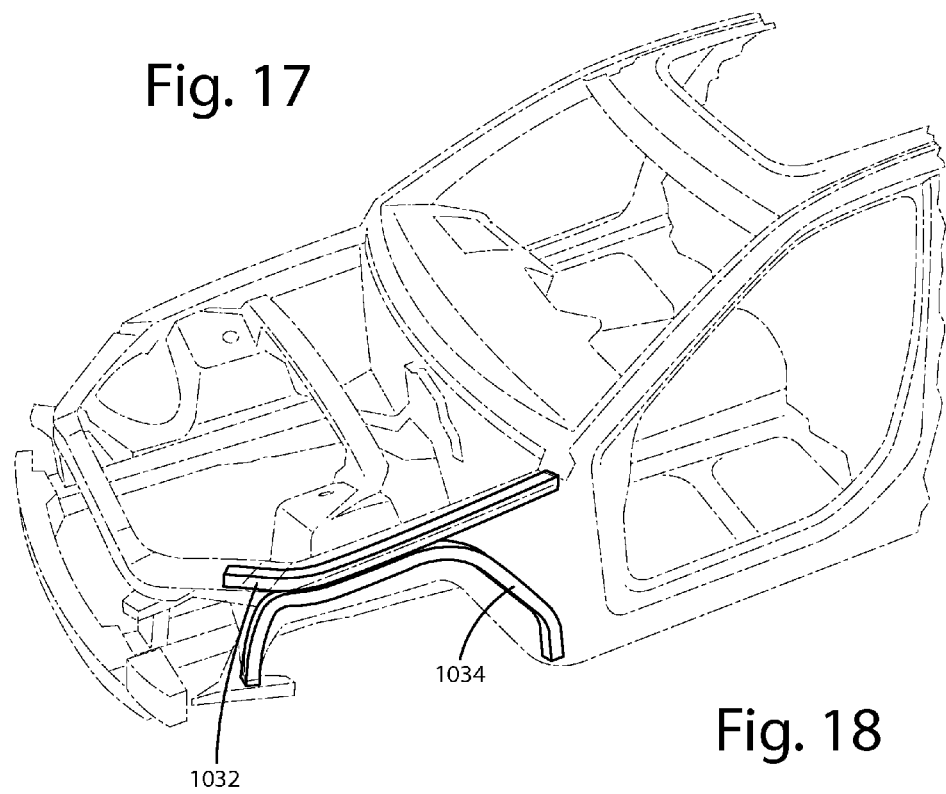

FIG. 17 illustrates an automotive body including a roll-formed component 1340 comprising both B-pillars and the roof support.

Figure 19:
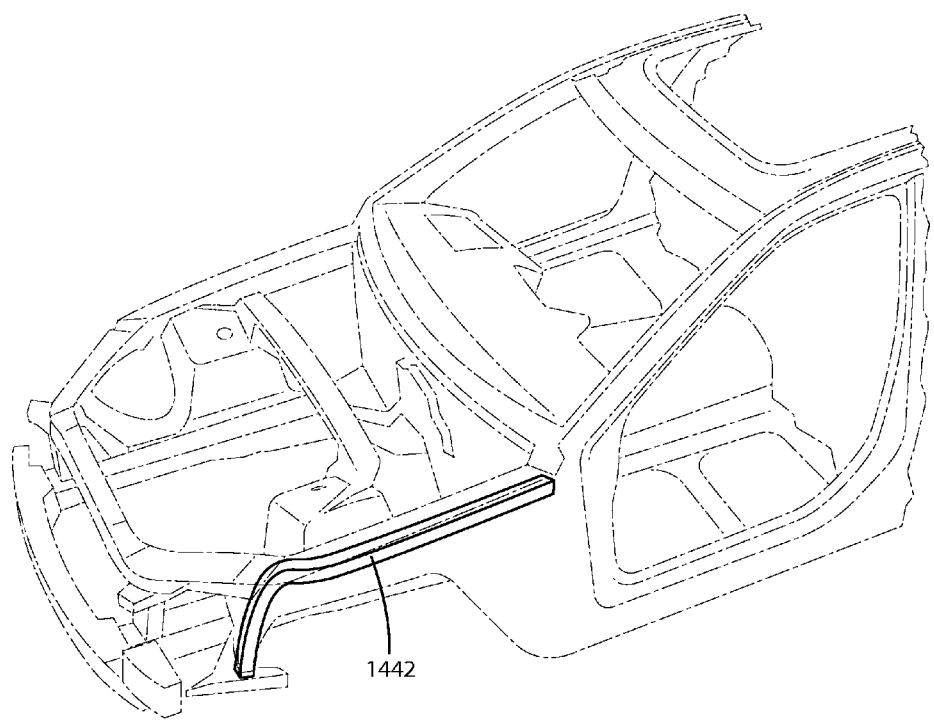
Figure 21:
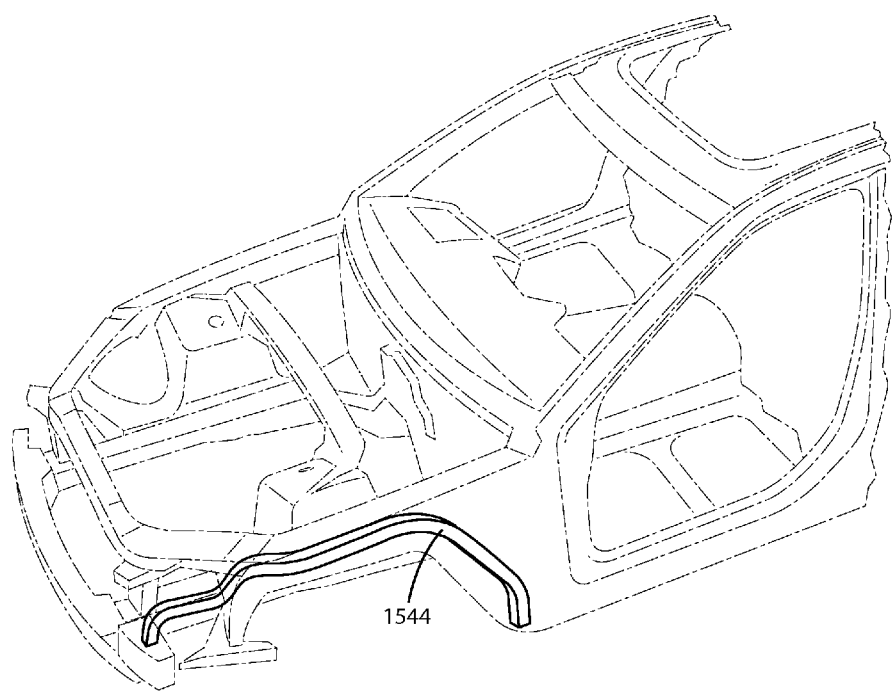

FIGS. 19-21 illustrate automotive bodies including roll-formed shotgun components 1442 (FIG. 19), 1238 (FIG. 20), and 1544 (FIG. 21) extending between (a) the hinge pillar and (b) the rail, the crush can, or brackets or extensions connected to the rail or the crush can.

Figure 22:
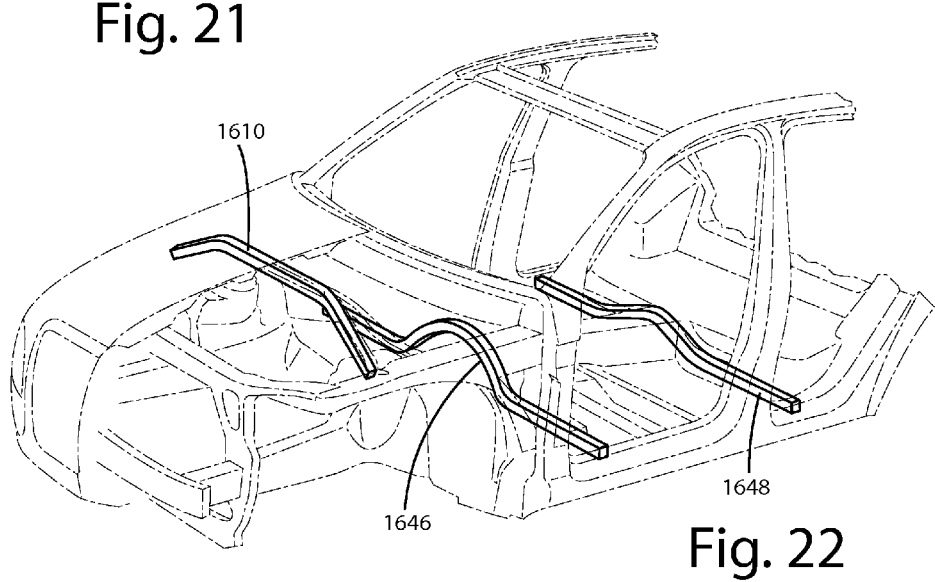

FIG. 22 illustrates an automotive body including roll-formed floor cross-car components (or cross-car seat support components) 1646 and 1648 and a shotgun brace component 1610.

Figure 23:
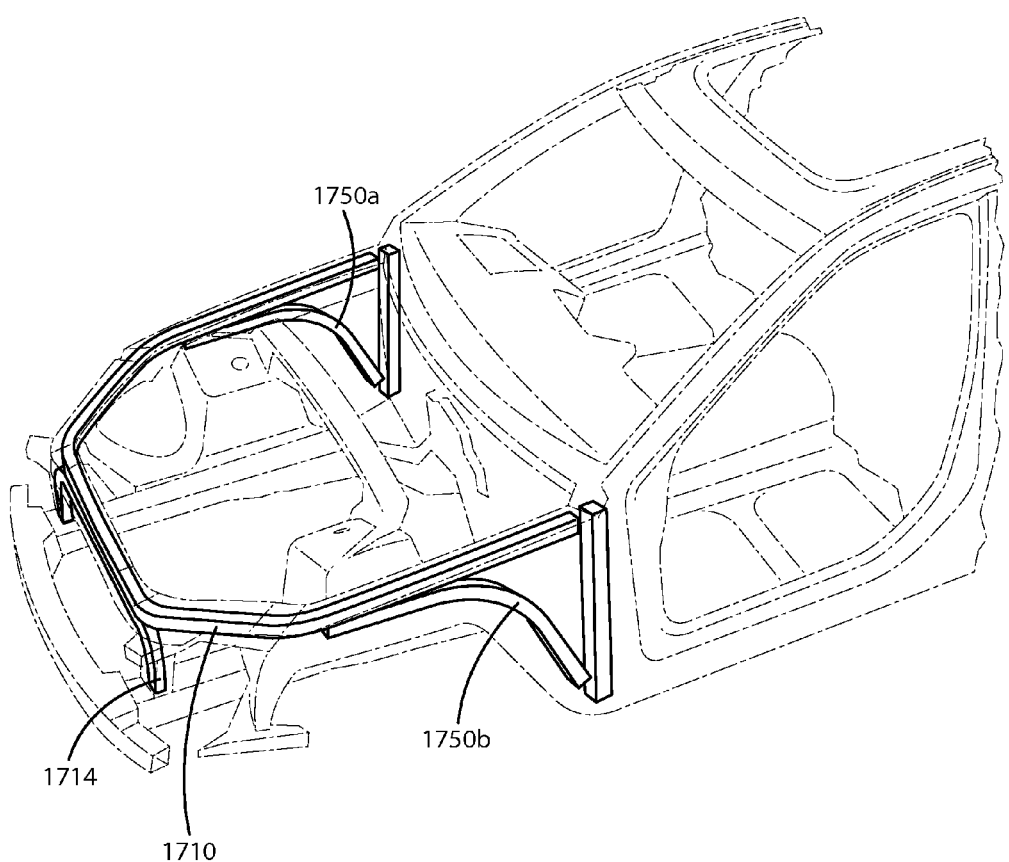

FIG. 23 illustrates an automotive body including roll-formed shotgun components 1710, roll-formed fender liner components 1750a and 1750b, and a roll-formed lower component 1714.

Figure 24:
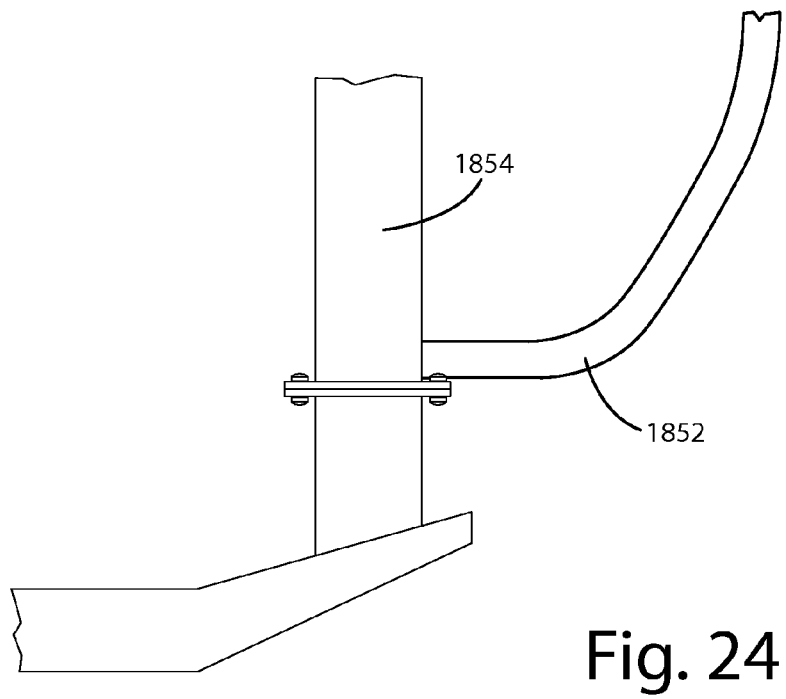
FIG. 24 is a top view showing an attachment of a roll-formed component to another body component.
Figure 25:
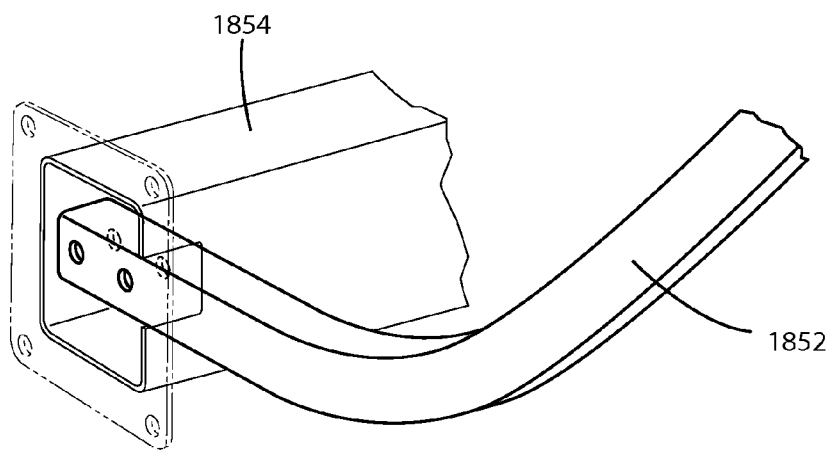
FIG. 25 is a perspective view showing another attachment of a roll-formed component to another body component.

FIGS. 24 and 25 illustrate one possible means of connecting a roll-formed component 1852 to a crush can 1854.

While various roll-formed components and combinations of roll-formed components are illustrated in the drawings, the concepts of the present invention extend to a wide variety of body components and combinations of components.

Figure 26:
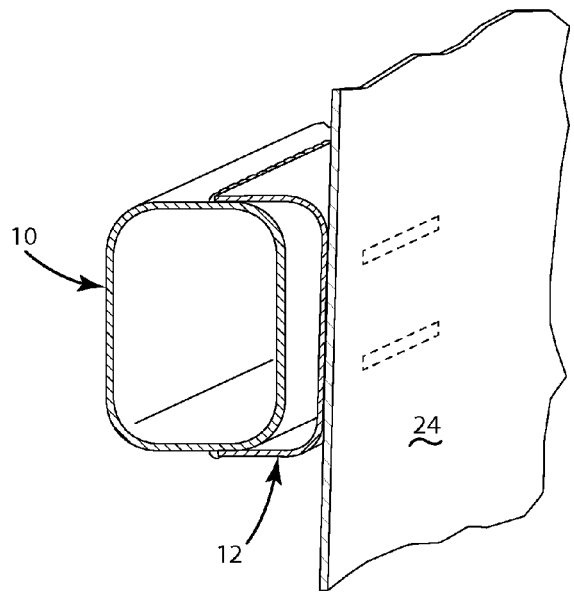
FIG. 26 is a perspective view of the slip-plane bracket welded to a roll-formed component and supporting a body panel.
Figure 27:
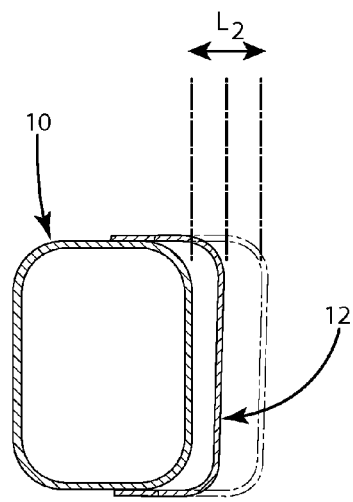
FIG. 27 is an end view of the slip-plane bracket and the roll-formed component.

The adjustability of the bracket 12 with respect to the rail 10 is illustrated in FIGS. 26-27. The bracket 12 is adjustable both laterally $L_2$ (see especially FIG. 27) and longitudinally with respect to the rail 10, so that the bracket "floats" with respect to the rail during manufacture. After the bracket 12 is in a desired position, the bracket 12 is welded to the rail 10, for example using laser welding or resistance welding. The adjustability during manufacture compensates for variations (within defined tolerances) in the three-dimensional roll-formed roof rail, so that a body panel or other sheet metal 24 attached to the bracket may have a relatively precise position with respect to other automotive body components—especially another body panel or sheet metal. The brackets therefore enable the body panels to be precisely positioned.

Figure 28:
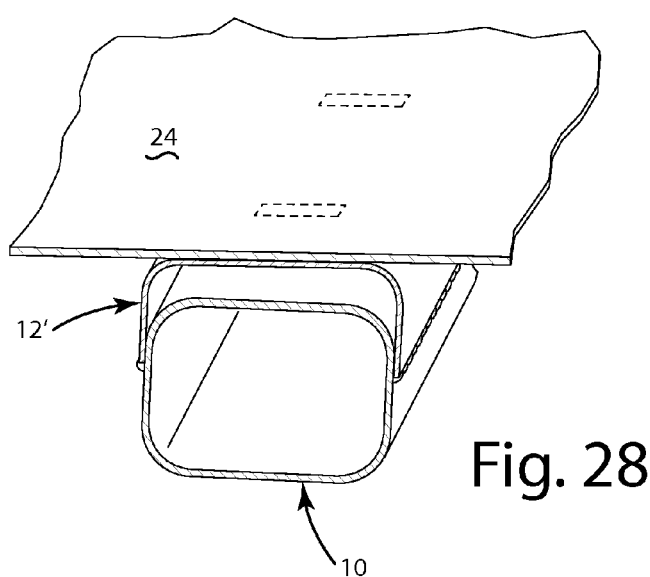
FIG. 28 is a perspective view of another slip-plane bracket welded to a roll-formed component and supporting a body panel.

An alternative bracket 12' is illustrated in FIG. 28 and differs from the bracket only in its width so that it may float on the narrow dimension of the rail 10 rather than the wide dimension of the rail. The functionality of the alternative bracket 12' is essentially the same as the functionality of the bracket 12.

Figure 29:
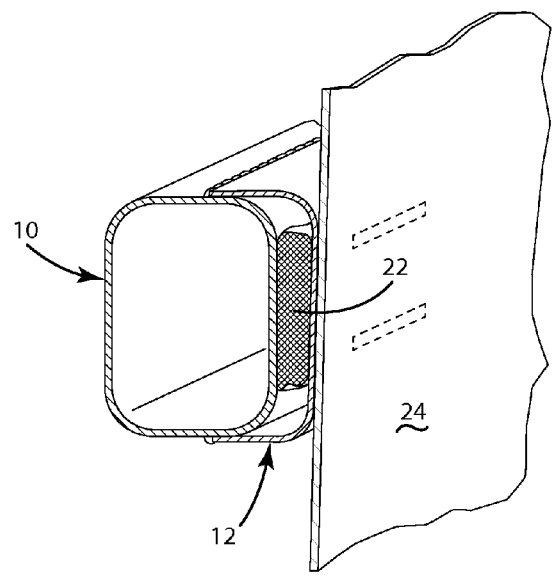
FIG. 29 is a perspective view of the slip-plane bracket adhered to the roll-formed member and supporting a body panel.
Figure 30:
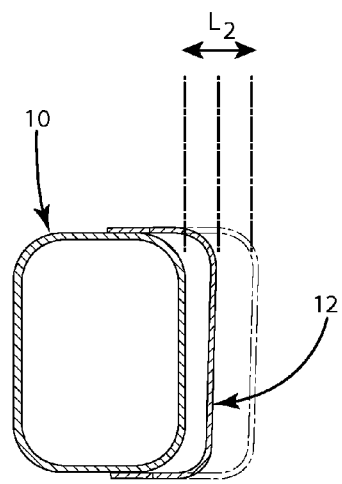
FIG. 30 is an end view of the slip-plane bracket and the roll-formed component.
Figure 31:
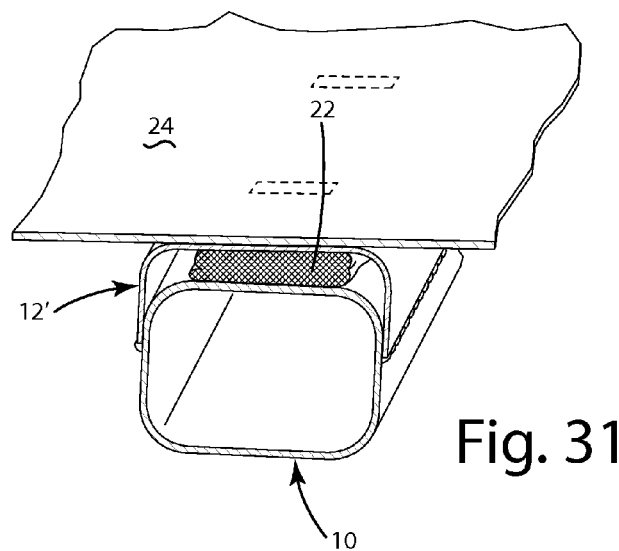
FIG. 31 is a perspective view of another slip-plane bracket adhered to a roll-formed component and supporting a body panel.

FIGS. 29-31 correspond to FIGS. 26-28 respectively and illustrate the additional inclusion of expanding structural adhesive 22, which improves modal stiffness and NVH (noise, vibration, and harshness) attributes.

The brackets may be attached to the rail or other component during either (a) manufacture of the rail or other component or (b) assembly of the vehicle.

Roll forming enables the use of relatively high-strength materials—in comparison to the materials used in hydro-forming. For example, roll forming can use materials up to 1700 MPa, with materials of 1500 MPa being fairly common. The higher strength materials enable the roll-formed components to be smaller in cross section, providing (a) reduced mass, (b) increased passenger compartment room, and (c) reduced vehicle height, in turn providing a sportier, more streamlined appearance.

The above descriptions are those of current embodiments of the invention. Various alterations and changes can be made without departing from the spirit and broader aspects of the invention.

The embodiments of the invention in which an exclusive property or privilege is claimed are defined as follows:

1. An automotive body assembly comprising:
   a roll-formed component swept in at least one dimension along its length; and
   at least one bracket having a pair of members engaging opposing walls of the component and, before being attached to the component, adapted to be adjustably positioned with respect to at least one of a first direction substantially parallel with the length of the component and a second direction substantially parallel with the opposing walls of the component, whereby the bracket provides dimensional compensation for precisely positioning an attachment portion of the bracket relative to the component, the attachment portion adapted to secure an additional body component.

2. An automotive body assembly as defined in claim 1 wherein the component is a pillar.

3. An automotive body assembly as defined in claim 1 wherein the component is a rail.

4. An automotive body assembly as defined in claim 1 wherein the component is swept in at least two orthogonal directions.

5. An automotive body assembly as defined in claim 1 wherein the at least one bracket includes a U-shaped cross section defined by the pair of members and an intermediate portion of the bracket extending between the pair of members.

6. An automotive body assembly as defined in claim 5 wherein the at least one bracket is adjustable at least laterally in the first direction and longitudinally in the second direction with respect to the component before attachment to the component, thereby compensating for tolerance variations in the swept curvature of the component when attaching the additional body component.

7. An automotive body assembly as defined in claim 1 wherein the at least one bracket is welded to the component.

8. An automotive body assembly as defined in claim 1 wherein structural adhesive adheres the at least one bracket to the component.

9. An automotive body assembly kit comprising:
   an elongated component having a longitudinal curvature; and
   a bracket engaging opposing sides of the elongated component and, before being fixedly attached to the elongated component, adjustably positionable with respect to the elongated component in at least two orthogonal directions for precisely positioning the bracket relative to the elongated component.

10. An automotive body assembly kit as defined in claim 9 wherein the elongated component is roll-formed.

11. An automotive body assembly kit as defined in claim 9 wherein the component is a pillar.

12. An automotive body assembly kit as defined in claim 9 wherein the component is a rail.

13. An automotive body assembly kit as defined in claim 9 wherein the component is curved in at least two orthogonal directions.

14. An automotive body assembly kit as defined in claim 9 wherein the bracket is adjustable at least laterally and longitudinally with respect to the component.

15. An automotive body assembly kit as defined in claim 9 wherein the bracket is adapted to be welded to the component.

16. An automotive body assembly kit as defined in claim 9 further comprising structural adhesive adapted to adhere the bracket to the component.

17. A method of manufacturing an automotive body assembly comprising:
   roll-forming a component;
   sweeping the component in at least two orthogonal directions along the component;
   engaging opposing walls of the component with a bracket;
   adjustably positioning the bracket with respect to the component to a desired position by moving the bracket relative to the component in at least one direction; and
   attaching the bracket to the component in the desired position to compensate for tolerance variations in the swept curvature of the component.

18. A method as defined in claim 17 wherein the component is a pillar.

19. A method as defined in claim 17 wherein the component is a rail.

20. A method as defined in claim 17 wherein the bracket is positioned by moving the bracket in at least one of a first direction substantially parallel with a length of the component and a second direction substantially parallel with the opposing walls of the component.

21. A method as defined in claim 17 wherein the positioning step includes adjustably positioning the bracket in at least two orthogonal directions with respect to the component.

22. A method as defined in claim 21 wherein the at least two orthogonal directions include laterally and longitudinally with respect to the component.

23. A method as defined in claim 17 wherein the attaching step includes welding.

24. A method as defined in claim 17 wherein the attaching step includes structurally adhering.

25. An automotive body assembly comprising:
   a roll-formed component swept in two orthogonal dimensions; and
   a dimensional compensation bracket attached at opposing walls of the roll-formed component in an adjusted position having a portion of the bracket spaced laterally from the roll-formed component in a desired location to secure an additional vehicle component at a mounting plane of the bracket.

26. An automotive body assembly as defined in claim 25 wherein the component is at least one of a pillar and a rail.

27. An automotive body assembly as defined in claim 25 wherein an adhesive extends in the spacing between the roll-formed component and the dimensional compensation bracket to intersecure the two.

* * * * *